United States Patent [19]

Nagy et al.

[11] Patent Number: 5,747,404

[45] Date of Patent: May 5, 1998

[54] POLYSILOXANE SUPPORTED METALLOCENE CATALYSTS

[75] Inventors: Sandor Nagy, Grand Island; John A. Tyrell, Williamsville, both of N.Y.

[73] Assignee: Lyondell Petrochemical Company, Houston, Tex.

[21] Appl. No.: 654,435

[22] Filed: May 28, 1996

[51] Int. Cl.$^6$ .................................................. C08F 4/64
[52] U.S. Cl. .................. 502/104; 502/117; 502/125; 502/152; 526/126; 526/127; 526/160; 526/348.6; 526/943
[58] Field of Search .................. 502/104, 117, 502/125, 152; 526/126, 127, 348.6, 160, 943

[56] References Cited

U.S. PATENT DOCUMENTS 5,071,808 12/1991 Antberg et al. .................. 502/107
5,473,020 12/1995 Peifer et al. .

FOREIGN PATENT DOCUMENTS

| 0 372 414 A | 6/1990 | European Pat. Off. . |
| 0725 086 A | 8/1996 | European Pat. Off. . |
| 196 36 233 A | 3/1997 | Germany . |
| 06087923 | 3/1994 | Japan . |

OTHER PUBLICATIONS

Macromolecular: Rapid Communications, vol. 16, No. 12, 1 Dec. 1995, pp. 905–911, XP000583889, Kazuo Soga et al.: "Olefin Polymerization with Metallocene Catalysts Supported on Polysiloxane Derivatives".

Primary Examiner—David W. Wu
Attorney, Agent, or Firm—Liddell, Sapp, Zivley, Hill & Laboon, L.L.P.

[57] ABSTRACT

Disclosed is a catalyst having the formula

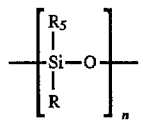

where each R is independently selected from aliphatic from $C_1$ to $C_6$ and aromatic from $C_6$ to $C_{10}$, each $R_5$ is independently selected from H, R, and L', each L' is independently selected from $LM'L_rX_{3-r}$ or two L' groups form the bridge —$LM'X_{2-r}L_r$—, each L is independently selected from cyclopentadienyl, indenyl, and fluorenyl, X is chlorine or bromine, M' is zirconium, titanium, or hafnium, n is 5 to 500, the ratio of R to H+L in $R_5$ is 0 to 100, the ratio of H to L' in $R_5$ is 0 to 4, and r is 0 or 1.

12 Claims, No Drawings

POLYSILOXANE SUPPORTED METALLOCENE CATALYSTS

BACKGROUND OF THE INVENTION

This invention relates to a polysiloxane supported metallocene catalyst, to its preparation, and to intermediates used in preparing it. In particular, it relates to a catalyst having the formula

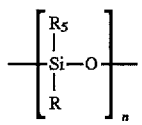

where at least some of the $R_5$ groups are metallocene groups.

Metallocene catalysts are a new class of catalysts which are gradually replacing Ziegler catalysts for the polymerization of ethylene and propylene. A metallocene catalyst typically consists of a transition metal compound bonded to at least one ligand that contains a cyclopentadienyl ring. Because supported catalysts are more stable, may produce higher molecular weight polymers, and may produce useful changes in the morphology of the polymer, metallocene catalysts are often used in conjunction with a support, such as silica gel. However, it can be difficult to control the amount of catalyst on a silica gel support. Also, silica gel can deactivate some catalysts and can leave high concentrations of ash in the polymer.

SUMMARY OF THE INVENTION

We have discovered that a metallocene-type organometallic catalyst can be supported by bonding it to a silicon atom in a siloxane polymeric oil. Because the catalysts of this invention are bonded to a support they are expected to be significantly more thermally stable than other comparable unsupported catalysts. Enhanced thermal stability should make the catalysts suitable for use at higher temperatures, such as in the solution polymerization of ethylene. While most other unsupported catalysts are solids, the supported catalysts of this invention are soluble liquids and therefore they are more accessible to the reactants and are easier to use because solids handling equipment is not needed. The siloxane polymeric oil from which the catalysts are made is commercially available in a wide variety of molecular weights and degrees of hydrogenation, which permit the preparation of a variety of different catalysts to meet particular needs.

While supported catalysts typically have lower activities than unsupported catalysts, the catalysts of this invention have activities comparable to the unsupported catalysts, even though they are supported.

DESCRIPTION OF THE PREFERRED EMBODIMENTS

The catalysts of this invention are prepared from a polysiloxane oil having the formula

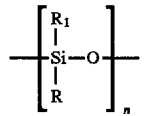

where each R is independently selected from aliphatic from $C_1$ to $C_6$ and aromatic from $C_6$ to $C_{10}$, each $R_1$ is independently selected from H and R, n is 5 to 500, the ratio of R to H in $R_1$ is 0 to 100. Examples of R groups include methyl, ethyl, isopropyl, butyl, $CF_3$, vinyl, and phenyl. Methyl is preferred as those polysiloxane oils are more readily available. The preferred ratio of R to H in $R_1$ is 0 to 5 as at a ratio over 5 there are too few active sites in the catalyst. The number of repeating units, n, is preferably 10 to 100 because smaller polysiloxane oils are too volatile and larger polysiloxane oils are more difficult to react and have poorer solubility. The above-described polysiloxane oils are commercially available in a variety of molecular weights and degrees of hydrogenation.

In the first step of preparing the catalyst according to this invention, the polysiloxane oil is reacted with bromine or chlorine to replace at least some of the hydrogens on the silicon atom with bromine or chlorine, respectively. Preferably, 80 to 100% of the hydrogens are replaced, as if fewer hydrogen atoms are replaced the catalyst is less functionalized. Chlorine is preferred to bromine because it is less expensive. While this reaction will occur without a solvent, it is preferable to perform the reaction in a non-reactive solvent such as carbon tetrachloride, methylenechloride, dichloroethane, or carbon disulfide as the reaction is then easier and more homogenous. The solution is preferably about 5 to about 30 wt % polysiloxane and the remainder solvent. The reaction proceeds rapidly at about 0° to about 60° C. and, in the case of bromine, can be monitored by the disappearance of color. If a solvent is used, it should be removed by vacuum distillation after the reaction is over so that it does not react in the next step. The halogenated polysiloxane product is a yellow oil having the formula

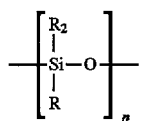

where each $R_2$ is independently selected from H, R, and Br or Cl.

In the next step, the halogenated polysiloxane produced in the first step is dissolved in a solvent inert to base such as tetrahydrofuran, diethylether, or toluene. Both the halogenated polysiloxane and the reagents used should be soluble in the solvent. The solution is preferably about 5 to about 30% halogenated polysiloxane and the remainder solvent. To the solution is added a compound having the formula $(H.L)_m M$, where M is Group I or II metal, m is the valence of M, and each H.L is independently selected from ligands containing a cyclopentadienyl (Cp) ring which have the formula:

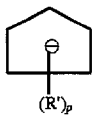

where each substituent group, R', is independently selected from a $C_1$ to $C_{20}$ hydrocarbyl group and p is a number from 0 to 4. In the case in which two R' groups are adjacent, they can be joined to produce a ring which is fused to the Cp ring. Examples of alkyl substituted Cp rings include butyl cyclopentadienyl, methyl cyclopentadienyl, and tetramethylcyclopentadienyl. Examples of fused Cp ring ligands include indenyl, tetrahydroindenyl, fluorenyl, and 2-methylindenyl. Fused rings can have the formulas

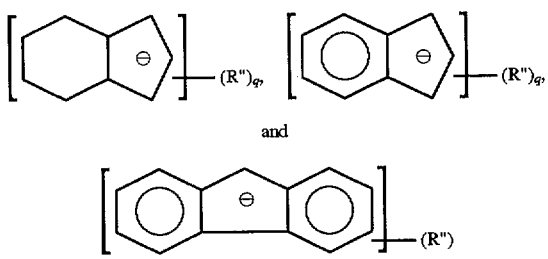

where R" is alkyl from $C_1$ to $C_{20}$ and q is 0 to the maximum number of substitutable positions such that there is at least one H remaining on the cyclopentadienyl ring. The reaction forms $MX_m$ and a polymeric oil having the formula

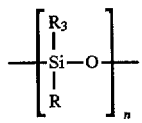

where x=Cl, Br, each $R_3$ is independently selected from H, R, H.L, the ratio of H to H.L in $R_3$ is 0 to 4, and each H.L is independently selected from

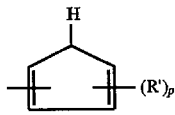

The amount of $(H.L)_mM$ used should be stoichiometric with the number of chlorine or bromine atoms on the halogenated polysiloxane. Examples of $(H.L)_mM$ compounds include cyclopentadienyl lithium, dicyclopentadienyl magnesium, indenyl lithium, fluorenyl lithium, and tetramethylcyclopentadienyllithium. The preferred $(H.L)_m$ M compound is cyclopentadienyllithium because of its ready availability. This reaction will proceed to nearly 100% completion at −78° C. to room temperature but it is preferably conducted at about −78° C. to about 0° C.

In the next step in preparing the catalyst, the hydrogen atom on the H.L ligand is removed to produce an L ligand. This is accomplished using a deprotonating agent such as alkyllithium, metallic sodium, sodium hydride, metallic potassium, or potassium hydride. The amount of deprotonating agent is preferably about stoichiometric with the hydrogen on the H.L ligand. This reaction can be performed in the same solvent and it occurs rapidly to nearly 100% completion at −78° C. to room temperature, though preferably temperatures used are less than 0° C. The resulting deprotonated polymeric oil has the formula

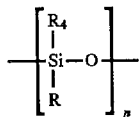

where each $R_4$ is independently selected from H, R, and L.

In the final step, the deprotonated polymeric oil is reacted with a compound having the formula

where M' is zirconium, titanium, or hafnium and is preferably zirconium as those catalysts seem to be superior, X is chlorine or bromine (preferably chlorine), and r is 0 to 1. Examples of $M'L_rX_{4-r}$ compounds include $ZrCl_4$, $CpZrCl_3$, $InZrCl_3$, $FlZrCl_3$, $ZrBr_4$, $TiCl_4$, and $CpTiCl_3$, where In is indenyl and Fl is flourenyl. The preferred $M'L_rX_{4-r}$ compound is $ZrCl_4$ because it works well. The $M'L_rX_{4-r}$ compound is preferably added stoichiometrically with the number of L ligands on the deprotonated polymeric oil. This reaction proceeds nearly to completion and can be performed in the same solvent at −78° C. to room temperature; it is also preferably performed at less than 0° C. The reaction mixture should be stirred for about 5 to about 16 hours and the solvent can then be removed by vacuum distillation. The resulting catalyst has the formula

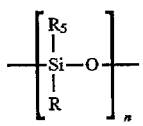

where each $R_5$ is independently selected from H, R, and L' and each L' is independently selected from $LM'L_rX_{3-r}$, or two L' groups form the bridge —$LM'X_{2-r}L_r$—. This bridge can be intra (on the same polymer chain) or inter (between two different polymer chains).

To prevent crosslinking of the polymer and for ease of handling, it is preferable to dissolve the catalyst in a solvent, preferably the solvent used in the polymerization, typically toluene or hexane. The catalysts are useful for polymerizing olefins such as ethylene, propylene, and copolymers therewith, such as ethylene/hexene copolymers.

The supported catalyst of this invention is preferably used in combination with a co-catalyst. Co-catalysts such as polymethylaluminoxane (PMAO) or other co-catalysts known in the art can be used. The molar ratio of co-catalyst to catalyst can be about 0.01:1 to about 100,000:1.

The following examples further illustrate this invention.

EXAMPLE 1

To a solution of 4.51 g of (30–35%) methylhydro-(65–70%) dimethylsiloxane [Huls America Inc., MW=2000–2100] in 40 ml $CCl_4$, was added 0.0094 moles of $Br_2$ solution in 1.3 ml $CCl_4$ at room temperature. After all the bromine had reacted, the volatiles from the reaction mixture were removed in vacuo, resulting in 5.0 g of a yellow oil. The brominated polysiloxane was dissolved in 20 ml. tetrahydrofuran (THF) and 0.977 g (0.0094 mol.) of cyclopentadienyl lithium solution in 40 ml THF was added slowly to the solution at −78° C. The mixture was again cooled to −78° C. and a solution of 0.0094 moles of butyllithium deprotonating agent (1.6M solution in hexanes) was added. After stirring for 30 minutes at the temperature of dry ice, the mixture was warmed to room temperature and stirred an additional 30 minutes. The mixture was cooled to −78° C. and 1.095 g (0.0047 mol.) of $ZrCl_4$ was added as a powder (addition tube rinsed with 20 ml of abs. THF) and stirred 1 hour at this temperature. The mixture was stirred 16 hours at room temperature and the solvent was removed under reduced pressure. The brown oily residue was dissolved in 40 ml of toluene and the solution was filtered. After removal of the toluene in vacuo, 5.3 g of brown oil was isolated. This catalyst has the formula

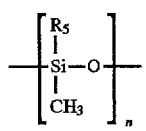

where $R_5$ is about 15% H, 70% $CH_3$, and 15%

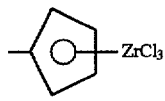

and n is about 29.

EXAMPLE 2

To a slurry of 6.7 g Montmorillonite K-10 (dried 1 hour at 200° C.) in 30 ml of toluene, 7 ml of PMAO (8.7 wt % Al) was added and the mixture was stirred for 2 hours. The solution of 2.6 g of polysiloxane bonded catalyst from Example 1 in 60 ml of toluene was added to the clay slurry and stirred for 3 days. Toluene was removed in vacuo.

EXAMPLE 3

All polymerizations in this study were conducted in a 1.7 L reactor at 80° C. Prior to conducting a polymerization, the reactor was "baked-out" by heating to 130° C. and holding at that temperature for 30 minutes under a nitrogen purge. Ethylene, hydrogen, butene, and nitrogen were treated by passage through columns containing 13× molecular sieves. The reactor was charged with 0.850 L of hexane or toluene and, using a syringe, the required volume of diluted PMAO (AKZO). The desired amount of hydrogen was added to the reactor by monitoring the pressure drop (ΔP) from a 1 L stainless steel vessel pressurized with hydrogen. The reactor was maintained at isothermal conditions throughout the run. Ethylene was admitted to the reactor and controlled at 150 psi with feed on demand via a pressure regulator. After the reactor temperature and pressure stabilized, a 0.1 wt/vol % solution of the catalyst was charged into the reactor by nitrogen over pressure and polymerization initiated. Ethylene flow was monitored via a Brooks mass flow meter.

Polymerization was terminated by venting the reactor and the polymer was recovered by filtration. The polymer was stabilized by the addition of about 1000 ppm of butylated hydroxytoluene/hexane (BHT) and further devolatilized 2 hours at 80° C. in a vacuum oven.

The following table gives the reaction conditions and the results.

| Run | Catalyst Preparation | Solvent | Butene (gms) | Catalyst (mgs) | Molar Ratio Al/M | $H_2$, ΔP | Reaction Time (min) | Yield (gms polyethylene) |
|---|---|---|---|---|---|---|---|---|
| 1 | Ex 1 | Toluene | 10 | 6 | 2275 | 5 | 5 | 50 |
| 2 | Ex 2 | Hexane | 0 | 83 | 500 | 10 | 30 | 5 |
| 3 | Ex 2 | Hexane | 0 | 88 | 500 | 10 | 60 | 43 |

The above table shows that the catalysts of this invention are effective in making polyethylene.

We claim:
1. A catalyst having the formula

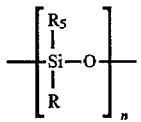

where each R is an aliphatic from $C_1$ to $C_6$ or an aromatic from $C_6$ to $C_{10}$, each $R_5$ is H, R, or L', each L' is $LM'L_rX_{3-r}$ or two L' groups form the bridge —$LM'X_{2-r}L_r$—, each L is a ligand having the formula

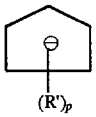

where each R' is a $C_1$ to $C_{20}$ hydrocarbyl group, p is 0 to 4, X is chlorine or bromine, M' is zirconium, titanium, or hafnium, n is 5 to 500, the ratio of R to H+L' in $R_5$ is 0 to 100, the ratio of H to L in $R_5$ is 0 to 4, and r is 0 to 1.

2. A catalyst according to claim 1 wherein R is methyl.
3. A catalyst according to claim 1 wherein L is cyclopentadienyl.
4. A catalyst according to claim 1 wherein L is indenyl.
5. A catalyst according to claim 1 wherein L is fluorenyl.
6. A catalyst according to claim 1 wherein n is 10 to 100.
7. A catalyst according to claim 1 wherein the ratio of R to H+L in $R_5$ is 0 to 5.
8. A catalyst according to claim 1 wherein M' is zirconium.
9. A method of making a catalyst according to claim 1 comprising (A) reacting a polysiloxane having the formula

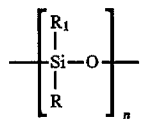

with $X_2$ to form a halogenated polysiloxane having the formula

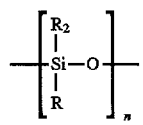

where each $R_1$ is H or R, each $R_2$ is $R_1$, Cl, or Br;

(B) reacting said halogenated polysiloxane with a compound having the formula $(H.L)_mM$ to form MX and a protonated polymeric oil having the formula

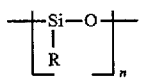

where M is a Group I or II metal, each $R_3$ is H, R, or H.L, and m is the valence of M;

(C) reacting said protonated polymeric oil with a deprotonating agent to produce a deprotonated polymeric oil having the formula

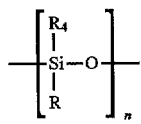

where each $R_4$ is H, R, or L; and (D) reacting said deprotonated polymeric oil with a compound having the formula $$ML_rX_{4-s}.$$

10. A solution comprising a catalyst according to claim 1 dissolved in a hydrocarbon solvent.

11. A catalyst according to claim 1 wherein R is methyl, ethyl, isopropoyl, butyl, vinyl or phenyl.

12. A method of polymerizing an olefin comprising contacting said olefin under polymerizing conditions with a catalyst according to claim 1.

* * * * *

UNITED STATES PATENT AND TRADEMARK OFFICE
CERTIFICATE OF CORRECTION

PATENT NO : 5,747,404
DATED : May 5, 1998
INVENTOR(S) : Sandor Nagy, et al.

It is certified that error appears in the above-identified patent and that said Letters Patent is hereby corrected as shown below:

Column 8, formula (D), that portion of the formula reading "$X_{4-5}$." should read --$X_{4-r}$--.

Signed and Sealed this

Twenty-fifth Day of August, 1998

Attest:

BRUCE LEHMAN

*Attesting Officer*    *Commissioner of Patents and Trademarks*